United States Patent [19]

Campbell

[11] Patent Number: 5,063,628

[45] Date of Patent: Nov. 12, 1991

[54] SURVIVAL DEVICE

[76] Inventor: Larry E. Campbell, 27575 Elderview Dr., Valencia, Calif. 91355

[21] Appl. No.: 488,175

[22] Filed: Mar. 5, 1990

[51] Int. Cl.$^5$ .............................................. A01B 1/00
[52] U.S. Cl. .......................................... 7/116; 294/51
[58] Field of Search .................................. 7/114, 116; 294/51-53.5

[56] References Cited

U.S. PATENT DOCUMENTS

| | | | |
|---|---|---|---|
| 2,833,585 | 5/1958 | Nischan | 294/51 |
| 4,475,757 | 10/1984 | Glock | 294/53.5 X |
| 4,700,420 | 10/1987 | Belanger | 7/114 |
| 4,748,762 | 6/1988 | Campbell | 43/21.2 |

FOREIGN PATENT DOCUMENTS

| | | | |
|---|---|---|---|
| 1171157 | 9/1958 | France | 7/116 |
| 332112 | 11/1935 | Italy | 294/53.5 |

Primary Examiner—James G. Smith
Attorney, Agent, or Firm—John J. Posta, Jr.

[57] ABSTRACT

The survival device is useful as a trenching tool, storage container, cooking and eating utensil, shoe horn, spade, hoe, grappling device, spear head, and the like. It includes an elongated hollow, tubular body with a detachable head bearing an elongated shallow dish-shaped blade. The blade is pivotably connected thereto for movement between a resting position along the side of the tubular body, an intermediate lockable position extending laterally 90° from the tubular body and a fully extended lockable position projecting forwardly of the tubular body in line with the length thereof. A locking plate interconnects the blade and head and is pivoted over a cross bar in the head. The locking plate has spaced notches in its periphery engageable with a cross pin to hold the plate and blade in the desired position. A locking ring may also be provided around the head. The tubular body may be split longitudinally and provided with a slip tightening ring so that the tubular body can be releasably secured over the end of a stick to use as a spear or knife. The head can be removed and replaced by a fish filet knife blade. The rear end of the tubular body can be threaded to receive additional storage tubes. The device is light weight, durable and efficient.

12 Claims, 2 Drawing Sheets

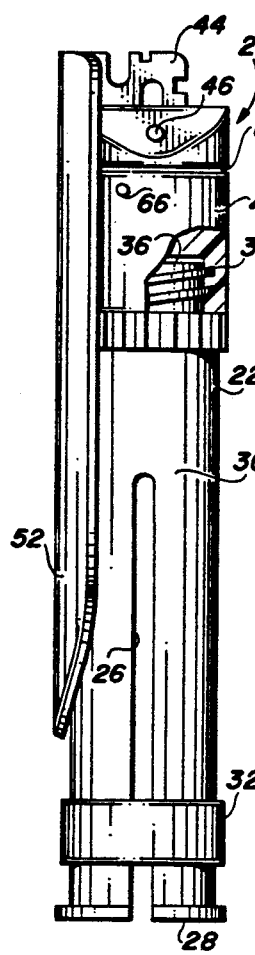
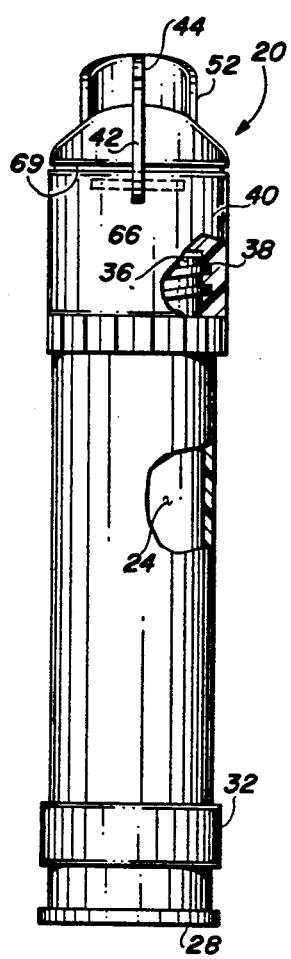
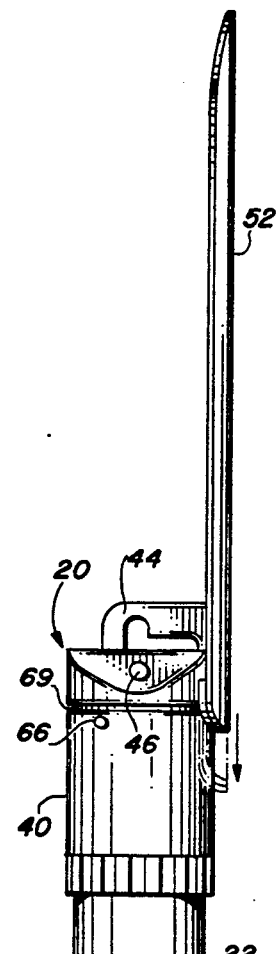
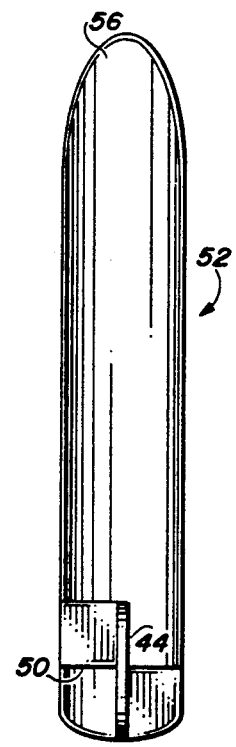
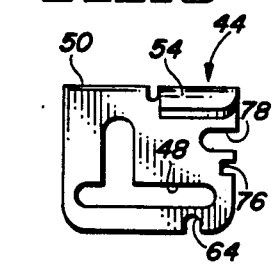
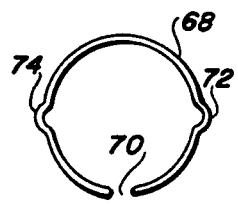
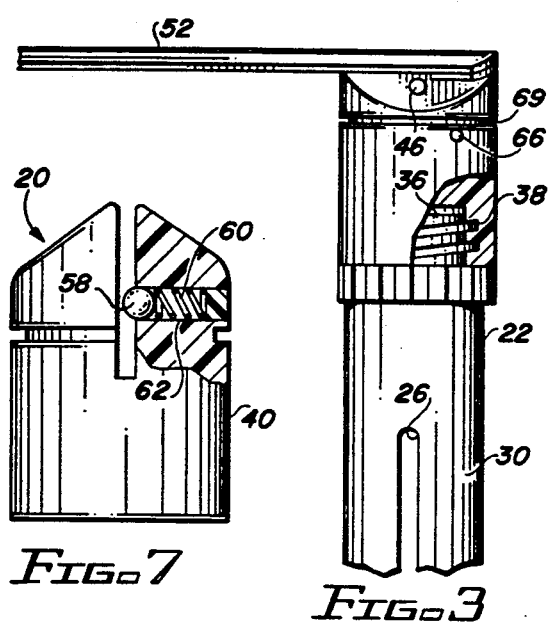

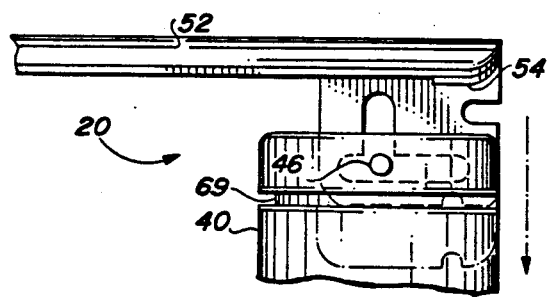
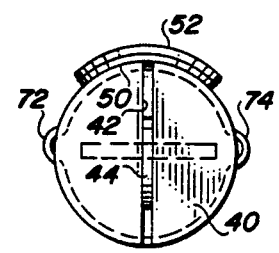
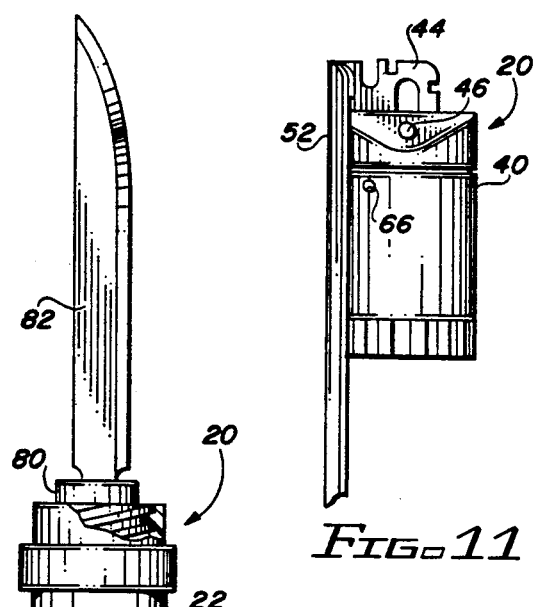
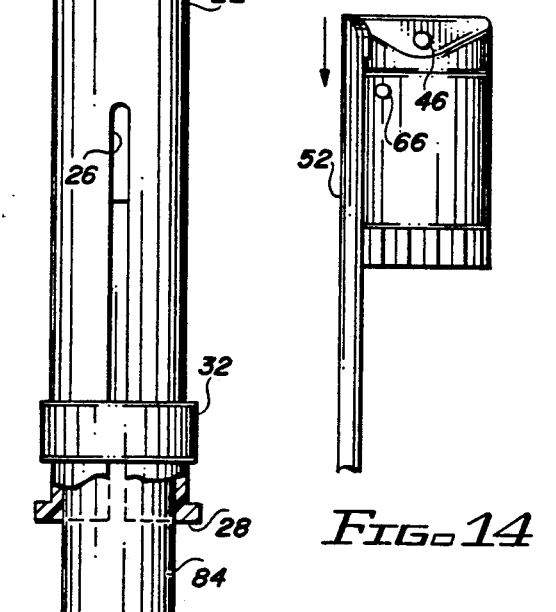
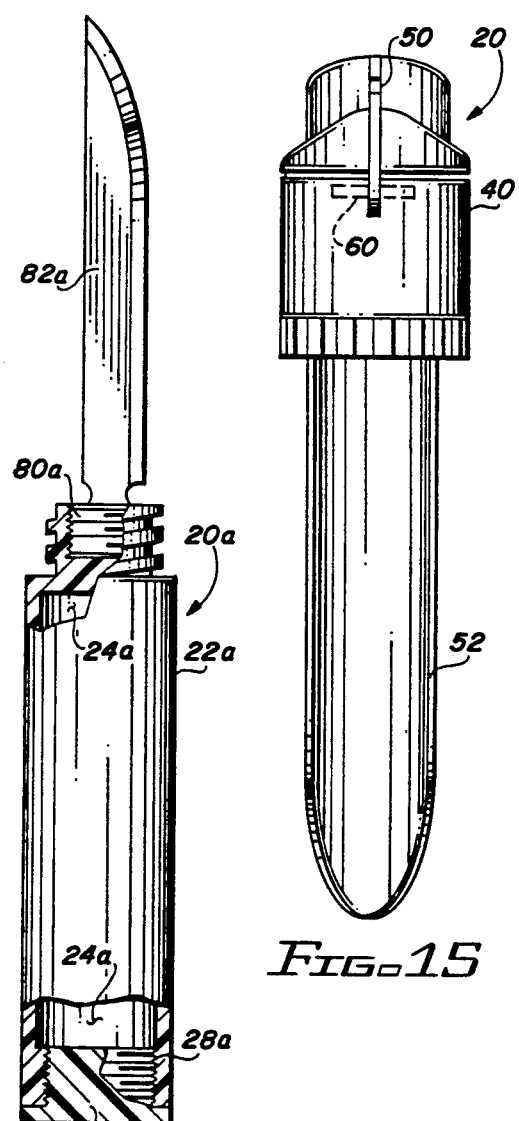

SURVIVAL DEVICE

BACKGROUND OF THE INVENTION

1. Field of the Invention

The present invention generally relates to survival equipment and more particularly to a device which is portable, small and light and which has multiple survival functions.

2. Prior Art

Various types of devices have been proposed for outdoor activities. See, for example, the fishing pole holder set forth in U.S. Pat. No. 4,748,762. Certain of such devices have been constructed for survival applications; that is, situations where living in the wild becomes a desire or necessity, and where mechanical aids are normally at a premium. Most survival devices or kits are cumbersome and do not have multiple utility. Accordingly, they are frequently left at home or used only sporadically.

There remains a need for an improved survival device which has improved multiple utility, for example, as a combination cooking and eating utensil, defensive weapon, hoe, spade, rake, grappling device, spear, and for other survival purposes. Such device should be small, light in weight, compact, durable, inexpensive and efficient.

SUMMARY OF THE INVENTION

The improved survival device of the present invention satisfies all the foregoing needs. The device is substantially as set forth in the Abstract of the Disclosure. Thus, the device includes an elongated hollow tubular main body which acts as a storage container or receptacle, to the front end of which is releasably secured a configured head, to which in turn a blade is pivotally connected, as by a locking plate. The locking plate fits in a slot in the head and is rotatable therein around a cross bar.

The locking plate includes two spaced notches in its periphery, each in turn engageable with a single cross pin in the head to releasably lock the blade into an intermediary position in which the blade extends laterally from the head at 90° thereto, or a fully extended position parallel to the main body but projecting forwardly thereof. The blade can also be pivoted into a resting position against the side of the main body for storage. In the fully extended blade position, the device functions as a cooking and eating utensil, rake, hoe, spade and spear head or knife. In the 90° blade position, the device functions as a grappling device, anchor, rake and the like. The storage space in the main body can hold a compass, thread, yarn, fishing line, food pills, matches, etc. The rear of the main body may be open and the main body may be split longitudinally so that a branch or stick can be wedged into the space therein from the rear and held in place by a slip ring. With this arrangement, the device becomes an armed pole or spear or javelin for fishing and defense.

The rear end of the main body may be threaded so that additional storage tubes can be held thereto. The front end of the main body preferably is threaded so that the head can be removed and a fish filet knife or the like can be threaded thereto. The device can also include a wire lock ring around the head for anchoring the blade in a selected position, and the slot in the head may be intercepted by a spring-biased ball which prevents the locking plate in the slot from rattling.

Various other features of the improved survival device of the present invention are set forth in the following detailed description and accompanying drawings.

DRAWINGS

FIG. 1 is a schematic side elevation of a first preferred embodiment of the improved survival device of the present invention, shown with the blade thereof in the resting unlocked position just prior to moving the blade to a stored position. The slot in the removable adapter accepts variable diameter handles; i.e., sticks, poles.

FIG. 2 is a schematic front elevation of the device of FIG. 1;

FIG. 3 is a schematic side elevation of the device of FIG. 1, shown with the blade thereof in the 90° locked position;

FIG. 4 is a schematic side elevation of the device of FIG. 1 in the fully extended unlocked position;

FIG. 5 is a schematic front elevation of the blade of the device of FIG. 1;

FIG. 6 is an enlarged schematic side elevation of the locking plate of the device of FIG. 1;

FIG. 7 is an enlarged schematic front elevation, partly broken away, of the head of the device of FIG. 1, showing the biased ball array therein.

FIG. 8 is an enlarged schematic top plan view of a locking ring utilized in the device of FIG. 1;

FIG. 9 is a schematic fragmentary side elevation of the head, locking plate and blade portion of the device of FIG. 1, shown in the 90° unlocked position;

FIG. 10 is a schematic side elevation of the device of FIG. 1 with the head removed and a fish filet knife substituted and with a stick inserted in the rear of the main body of the variable diameter stick adapter;

FIG. 11 is a schematic side elevation of the head of the device of FIG. 1 after removal from the main body of the device with the blade in the unlocked position just prior to moving the blade to a stored position;

FIG. 12 is a schematic top plan view of the head and lock ring of the device of FIG. 1; and, FIG. 13 is an enlarged schematic side elevation, partly broken away, of a second preferred embodiment of the device of the present invention, with a fish filet knife substituted for the head thereof on the removable storage tube;

FIG. 14 is a schematic side elevation of the head of the device of FIG. 1 after removal from the main body of the device and with the blade in a locked, stored position;

FIG. 15 is a schematic front elevation of the device of FIG. 2 after removal from the main body of the device and with the blade in an unlocked, stored position.

DETAILED DESCRIPTION

FIGS. 1–12.

Now referring more particularly to FIGS. 1–12 of the drawings, a first preferred embodiment of the improved survival device of the present invention is schematically depicted therein. Thus, device 20 is shown which comprises an elongated, hollow tubular main body 22 of plastic, metal, wood, rubber, ceramic or the like, preferably hard semi-transparent plastic, as shown. Body 22 defines a central storage space 24. Body 22 is preferably split longitudinally to provide one or more slits 26 extending from the open rear end 28 thereof to just forward of the middle 30 thereof. Main body 22 may also be provided with a knurled slip ring 32 so that a pole, stick or branch 34 (FIG. 4) can be wedged into space 24 from rear end 28 and held in place by slip ring 32 to mount device 20 on such pole 34 to form a defensive lance, fish, spear, javelin, etc.

The front end 36 of body 22 bears external threads 38 so that end 36 releasably receives internally threaded head 40. Head 40 may be fabricated of the same or similar material to that of body 22, or another material. Head 40 bears a slot 42 along the longitudinal centerline device 20 in which is disposed a flat generally rectangular locking plate 44 rotatably secured in head 40 by a cross bar 46 extending through a central lobed opening 48 in plate 44. Plate 44 bears a single 90° wing 50 or a pair thereof (FIGS. 5 & 12) to which is welded the rear end of an elongated blade 52. Blade 52 extends at a 90° angle to the top 54 of plate 44, and is preferably of metal, such as steel, with a curved front end 56 and a shallow dish-shaped cross-section, so that blade 52 can hold food, liquid, soil, etc.

Plate 44 is held in slot 42 against rattling by a ball 58 biased by a spring 60 in a channel 62 intersecting slot 42 so that only a part of ball 58 extends thereto as shown in FIG. 7. Plate 44 has a first notch 64 in the periphery thereof which is adapted to engage a cross pin 66 in head 40 when blade 52 is in the 90° intermediate position of FIG. 9 after blade 52 is pushed down in the direction of the arrow (FIG. 9) so that blade 52 is then in the locked position shown in FIG. 3. In this position, blade 52 cannot rotate. Blade 52 can be used to grapple or hook items and to dig in this position.

In order to double lock blade 52 in this position, a lock ring 68 (FIG. 8) is provided in an external groove 69 in head 40 perpendicular to the longitudinal axis of body 22. Ring 68 is of wire, is open at one end to provide a gap 70 and has two finger grips 72 & 74. Ring 68 is first turned by grips 72 & 74 so that gap 70 spans slot 42, allowing plate 44 to be shoved to the lock positon of FIG. 3. Then ring 68 is rotated by grips 72 & 74 so that gap 70 is away from slot 42 and the wire of ring 68 seats in a notch 76 in the periphery of plate 44 (FIG. 6), preventing any movement of plate from the 90° locked position, until wire ring 68 is again rotated to cause gap 70 to bridge slot 42 and clear notch 76.

When it is desired to place blade 52 in the fully extended position of FIG. 4 so as to use it as a cooking and eating utensil, shoe horn, digging tool, spear head, etc., it is merely rotated with plate 44 to that position and then locked into that position by shoving it in the direction of the arrow in FIG. 4 (to the position shown in dotted outline) so that notch 78 (FIG. 6) fully engages cross-pin 66 to hold it in place. The long travel to that position, plus the bracing of blade 52 against the side of body 22 assures that blade 52 will not rotate out of that position. Pushing of blade 52 towards head 40 merely tightens that lock.

Accordingly, blade 52 can be rotated between the resting storage position of FIG. 1 and the intermediate 90° position of FIG. 3, as well as the fully extended position of FIG. 4 for optimum utility and a variety of survival uses. Head 40 can be screwed off of body 22 (FIG. 11). A pole or stick 84 can be inserted into cavity 24 of body 22 and device 20 can now be used as a spear, if desired. Accordingly, the utility of device 20 is further improved.

FIG. 13.

A second preferred embodiment of the improved survival device of the present invention is schematically depicted in FIG. 13. Thus, device 20a is shown. Components thereof similar to those of device 20 bear the same numerals, but are succeeded by the letter "a". Although device 20a is only shown with fish filet knife 82a connected by base 80a to the front of tube body 22a, it will be understood that a head identical to head 40 can be substituted for knife 82a and base 80a. Body 22a differs from body 22 only in that it has no longitudinal slit like slit 26, has no slip ring like ring 32 and has an externally threaded rear end 28a releasably closed by a threaded end cap 90. Cap 90 can be removed and additional internally threaded tubular bodies (not shown) like main body 22a can be screwed on the rear end 28a for additional storage.

Various modifications, changes, alterations and additions can be made in the improved survival device of the present invention, its components and parameters. All such modifications, changes, alterations and additions as are within the scope of the appended claims form part of the present invention.

What is claimed is:

1. An improved survival device, said device comprising, in combination:
    a) a hollow tubular elongated main body having a curved side and opposite front and rear ends;
    b) a head detachably secured to said main body at said front end;
    c) an elongated blade pivotably connected to said head and movable between a storage position parallel to and adjacent to said side, an intermediate lockable position extending laterally at about a 90° angle to the longitudinal axis of said main body, and a fully extended lockable position projecting forwardly of said head parallel to said longitudinal axis, said blade being usable as a utensil, digging implement, knife blade, spear and grappling book;
    d) wherein said blade is connected to a locking plate pivotally secured to said head, said locking plate bearing a first notch on the periphery thereof releasably engageable in a cross pin in said head to lock said blade into said intermediate position and wherein said locking plate bears a second notch on the periphery thereof oriented 90° from said first notch and releasably engageable with said cross pin to lock said blade into said fully extended position.

2. The improved survival device of claim 1 wherein said locking plate extends perpendicular to said blade and rides in a slot in said head, being held therein by a cross arm in said head for rotation around said cross arm.

3. The improved survival device of claim 2 wherein said tubular main body is split longitudinally, open at the rear end thereof and provided with a slip tightening ring, whereby a stick, spear or handle can be releasably secured in said space.

4. The improved survival device of claim 2 wherein said head includes a spring-biased ball in a passageway intersecting said slot for releasably holding said locking plate against vibration.

5. The improved survival device of claim 2 wherein said head has an external peripheral groove perpendicular to and intersecting said slot, and a wire turn ring in said groove, said ring being open-ended to permit movement of said locking plate into said head for engagement with said cross pin, said ring being turnable to a position engaging a locking notch in said locking plate to prevent unlocking of said blade from at least one of said intermediate and fully extended positions.

6. The improved survival device of claim 5 wherein said ring is turnable to engage said locking notch when said blade is in said intermediate position.

7. An improved survival device, said device including:
   a) an elongated hollow, main body having a front end, a rear end, and a side,
   b) an elongated blade connected to said main body at said front end and movable to a rearwardly projecting stored position which is parallel to and adjacent said side of said main body,
   c) first locking means secured to the front end of said main body for locking said blade in a position wherein said blade extends outwards at approximately a 90° angle with respect to the longitudinal axis of said main body,
   d) second locking means for locking said blade in a fully extended position projecting forwardly of said main body and parallel to said longitudinal axis,
   e) wherein said main body includes a head detachably secured to said main body at said front end, and
   f) wherein said blade is connected to a locking plate pivotally secured to said head, said locking plate bearing a first notch on the periphery thereof releasably engageable in a cross pin in said head to lock said blade into said intermediate position and wherein said locking plate bears a second notch on the periphery thereof oriented 90° from said first notch and releasably engageable with said cross pin to lock said blade into said fully extended position.

8. The survival device of claim 7 wherein said locking plate extends perpendicular to said blade and rides in a slot in said head, being held therein by a cross arm in said head for rotation around said cross arm.

9. The survival device of claim 8 wherein said tubular main body is split longitudinally, open at the rear end thereof and provided with a slip tightening ring, whereby a stick, spear or handle can be releasably secured in said space.

10. The survival device of claim 8 wherein said head includes a spring-biased ball in a passageway intersecting said slot for releasably holding said locking plate against vibration.

11. The survival device of claim 8 wherein said head has an external peripheral groove perpendicular to and intersecting said slot, and a wire turn ring in said groove, said ring being open-ended to permit movement of said locking plate into said head for engagement with said cross pin, said ring being turnable to a position engaging a locking notch in said locking plate to prevent unlocking of said blade from at least one of said intermediate and fully extended positions.

12. The survival device of claim 11 wherein said ring is turnable to engage said locking notch when said blade is in said intermediate position.

* * * * *